United States Patent [19]
Peters

[11] 3,972,067
[45] July 27, 1976

[54] COLOR VIDEO SYNTHESIZER WITH MONOCHROME INPUT

[75] Inventor: David L. Peters, Whitney Point, N.Y.

[73] Assignee: The Singer Company, New York, N.Y.

[22] Filed: Jan. 17, 1975

[21] Appl. No.: 541,844

[52] U.S. Cl. .................................. 358/81; 323/79; 35/12 N
[51] Int. Cl.² ...................... H04N 9/02; G05F 3/02; G09B 9/08
[58] Field of Search .................. 358/27, 28, 29, 81, 358/82; 178/DIG. 35, 6, 6.8; 35/12 N, 10.2; 340/324 AD; 323/94 R, 75, 79; 317/663-666

[56] References Cited
UNITED STATES PATENTS

| | | | |
|---|---|---|---|
| 2,845,482 | 7/1958 | King et al. ............................. | 358/28 |
| 3,603,962 | 9/1971 | Lechner ................................ | 358/81 |
| 3,761,607 | 9/1973 | Hanssman ............................. | 358/81 |
| 3,769,458 | 10/1973 | Driskell ................................. | 358/81 |
| 3,770,884 | 11/1973 | Curran et al. ......................... | 358/81 |

*Primary Examiner*—John C. Martin
*Attorney, Agent, or Firm*—James F. Duffy; James C. Kesterson

[57] ABSTRACT

A novel variable resistive network is disclosed enabling the control of an odd number of signals wherein a selected one of said signals is held at a common reference level while others of said signals are varied in amplitude such that no one signal reaches a maximum input level amplitude at the same time as any other of said signals. Method and apparatus for achieving a color presentation from a video signal which may have no color content of its own is taught employing said variable resistive network for Hue control and using dual-input amplifiers having a weighted gate signal for Saturation control.

10 Claims, 4 Drawing Figures

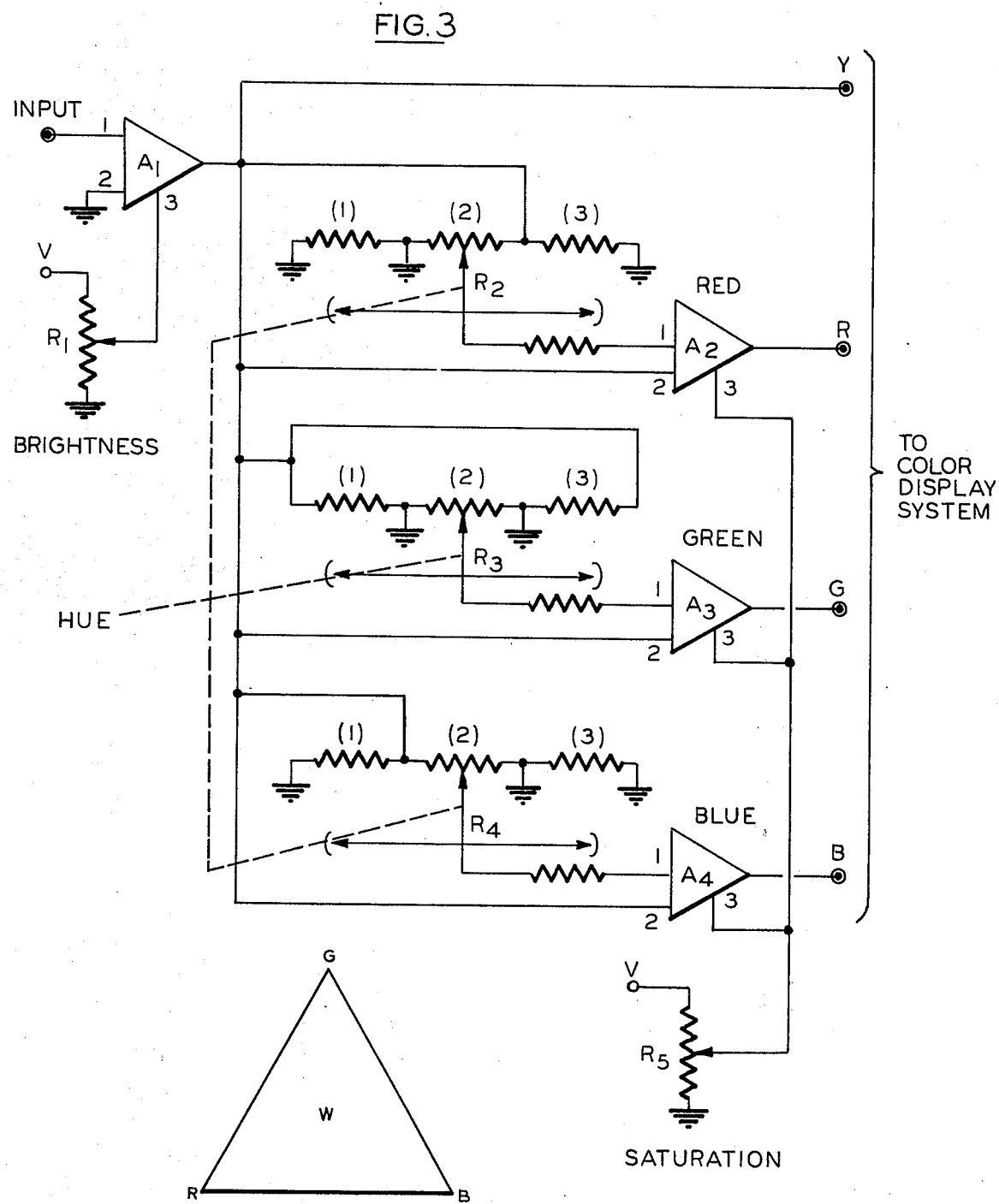

COLOR VIDEO SYNTHESIZER WITH MONOCHROME INPUT

BACKGROUND

The invention herein described was made in the course of or under a contract, or subcontract thereunder, with the Department of the Navy.

FIELD OF THE INVENTION

This invention relates to a variable resistive network for the control of an odd number of signals wherein a selected one of said signals is held at a common reference level while the others of said signals are varied in amplitude such that no one signal reaches maximum input level amplitude at the same time as any other one of said signals. In particular this invention relates to the use of such a network in achieving the color presentation on a cathode ray tube.

PRIOR ART

Cathode Ray Tube (CRT) displays for reproducing visually the output of digital or contact analog computers are familiar accessories to such computer systems. The data presented on such displays are often purely informational. However, there are instances in which, in addition to the information content, the display is meant to be psychologically stimulating as well.

An example of this latter type display occurs with the use of aircraft simulators used for training pilots. Using various optical schemes and CRT displays the trainee pilot may be presented with an out-the-window view of a synthetically generated terrain. The synthetic terrain frequently takes the form of a grid of mutually perpendicular and parallel lines viewd in the perspective that would be determined by the simulated aircraft's supposed attitude and height. To enhance the effect of observing an actual earth terrain passing beneath the pilot-trainee, the display provides a horizon and a sky area; shades of gray are used to introduce some variety while cloud effects in the sky are often included using video-insertion techniques.

To further enhance the reality of the display it is desirable to provide color so that the sky appears blue and the terrain, instead of taking on varying shades of gray, is selectively colored so that areas of earth, greenery, and bodies of water might be more realistically simulated. To this end it is an object of this invention to accept video signals which may have no color information and to output appropriate Red, Green and Blue color signals for use with a color display system.

Prior attempts at obtaining color from such video signals have typically consisted of inputing the single video signal to three color amplifiers, one each for Red, Green and Blue output signals. Each color amplifier had its own video gain control. To establish the hue and color saturation desired at the CRT it was necessary to adjust each gain control independently. Having attained a desired hue and saturation, the independent gain controls were then simultaneously adjusted to control the brightness of the CRT display. Using such a scheme it was most difficult, if not impossible to actually obtain the proper tone, i.e., hue, brightness, and saturation, in the final color output displayed.

Therefore, it is a further object of this invention to eliminate the independent character of such gain controls and to provide for simultaneous adjustment so that the color of the output video displayed may be simply adjusted to any hue desired.

In addition, the invention shall provide that the saturation of the hue may be easily adjusted from purest color capable of display through pastel ranges to white; that the brightness of any particular hue may be independently set from black through maximum brightness; and that the controls for establishing hue, saturation, and brightness be minimum in number and non-interacting.

SUMMARY OF THE INVENTION

The invention disclosed herein is a variable resistive network comprising, in the embodiment presented, three ganged, three-resistive-section potentiometers connected such that a different one of such resistive sections on each potentiometer is held to a constant reference level. Each potentiometer receives an input signal applied to a terminal which lies directly opposite the resistive section so held at said constant reference level.

An embodiment here disclosed further comprises an amplifier, one input port and multiple output ports. The input port connects to a common amplifier stage having a variable gain control affecting equally the gain (brightness) at each output port. The output of the common amplifier stage connects, in parallel, a multiplicity of paired taps. Each pair of taps is connected, one through one of said potentiometers of said variable resistive network, the other directly, to a dual-input amplifier stage. The dual-input amplifiers sum the input from each pair of taps in a manner determined by the weight of a gate signal applied to each of said amplifiers. The gate signal is applied equally to each of the dual-input amplifiers through a variable resistor (the saturation control). Each of said potentiometers of said variable resistive network between the common amplifier stage and the dual-input amplifiers are ganged together, as already noted, for simultaneous control (the hue control). The signals from each of the dual-input amplifiers are connected to the output ports from which point they may be fed to the proper terminals of a color CRT display system.

BRIEF DESCRIPTION OF THE DRAWING

FIG. 3 is that of a schematic diagram of a video color control circuit.

FIG. 4 depicts a color triangle.

DESCRIPTION OF THE INVENTION

The art of vehicle simulation has advanced tremendously since Edwin A. Link obtained a patent on a "Combination Training Device for Student Aviators and Entertainment Apparatus", U.S. Pat. No. 1,825,462 issued Sept. 29, 1931. Visual systems have progressed from images on moving belts through film projection, and optically scanned scale models to today's systems in which contact analog computers generate video imagery presentations or synthetic areas are generated and video insertion techniques employed.

The effect of realism may be heightened if the artificially generated displays are presented in color. Once the decision is made to offer a color display the problem arises of how a desired hue may be obtained from a signal which may have no color content. Further, once the hue is selected the problem of control of color saturation and brightness must be solved.

The present invention solves these problems and presents a circuit which will accept a video signal of no color content and provide color signals to a color CRT system. Three simple controls are provided one each for Hue, Saturation and Brightness.

In color television it is possible to establish the hue of color to be presented by holding one of the three typically applied input signals at zero reference and varying the other two signals such that one signal is maximum while the other is a minimum, the variation causing the signal originally at a maximum to decrease while the signal originally at a minimum increases. These typical signals generally comprise the red, green and blue, RGB, color information signals. This technique of color control is discussed in greater detail later in the body of this disclosure.

As already noted, prior art usually employed three independently controlled amplitude varying means to achieve such color control.

The present invention is particularly suited to circuitry which sequentially holds one of a given odd number of signals at a reference level, such as ground, for example, while continuing to vary the remaining signals of the given group. No two or more of said signals so varied, ever achieve maximum input level amplitude simultaneously. Because color control peculiarly lends itself to the use of three signals with the invention such an embodiment will be disclosed herein.

Figure 1:
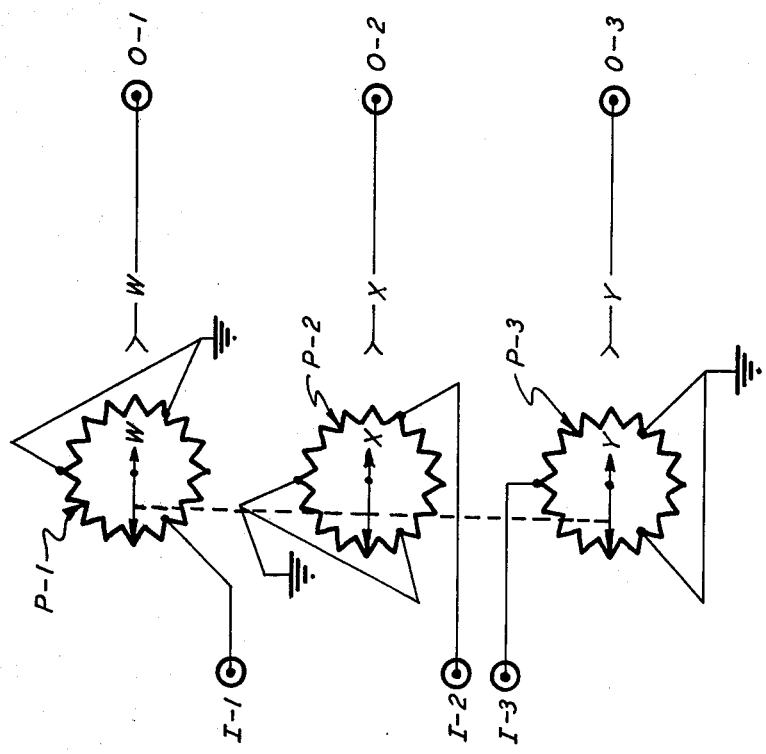
FIG. 1 shows a schematic of the variable resistive network.

The embodiment of the invention depicted in FIG. 1 has 3 input terminals, 3 output terminals, and 3 output terminals, and 3 three-section potentiometers with wiper arms ganged together for simultaneous control. Instead of the quantity "3" in the above statement any odd number, 5, 7, etc., would suffice in implementing the invention.

In FIG. 1, each of Pots P-1 through P-3 have one resistive section shorted to ground potential. In practice ground or any convenient reference level may be employed. As FIG. 1 shows, a different section is so shorted in each pot. Inputs I—1 through I—3 are connected to the terminals of Pots P-1 through P-3 respectively which are diametrically opposite the sections so shorted.

As the wiper arm of any one of Pots P-1 through P-5 advances through the shorted section, the output terminal remains at the reference potential. As the wiper arm leaves the shorted section the potential at the output terminal departs from reference level and approaches the level of the input terminal. As the wiper arm passes the input terminal of the pot in question the output terminal departs from the potential level of the input terminal and again approaches that of the reference.

Because of the manner in which the pots are utilized no one output terminal ever is at input potential level simultaneously with any other output terminal and there is always at least one output terminal which is at reference level.

In the position of the wiper arms as shown in FIG. 1 and assuming a clockwise rotation, O-1 is leaving the input level and approaching the reference level; O-2 is held at reference level; while O-3 is leaving the reference level and approaching the input level. A greater insight into the usefulness of such an arrangement will be gleaned from the discussion of the color triangle later in this specification.

Figure 2:
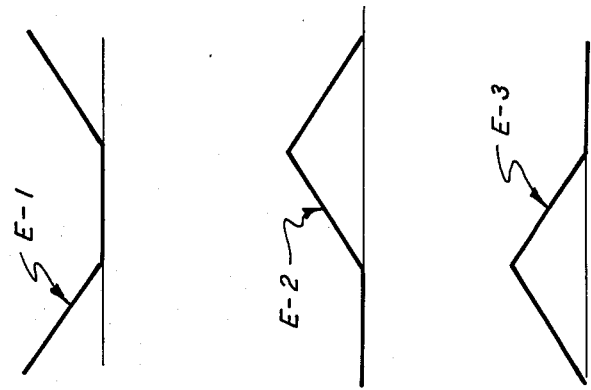
FIG. 2 indicates relative output levels taken from each potentiometer wiper arm in the circuit of FIG. 1 (assuming a common input source, not shown).

FIG. 2 illustrates the potential level excursions E-1 through E-3 experienced at output terminals O-1 through O-3 assuming a common, positive d.c. potential applied to inputs I—1 through I-3. Of course, use of the invention is not restricted to d.c. inputs nor to common input signal sources.

Though the embodiment depicted concerns only three signals, as already noted the teachings here are applicable to similar control of any odd number of signals in excess of one as hereafter shown. Assume that $n$ represents an odd number such as 3, 5, 7, etc. Given n-signals, one of which is to be held at a reference while $(n - 1)$ signals are varying as discussed above, a variable resistive network comprising n-potentiometers each of n-sections and all ganged for simultaneous control would be required. An input signal would be applied to a different terminal on each of said potentiometers. The resistive section opposite the terminal selected to receive the input signal would be held at the desired reference level by connecting each end of said section to the same reference point. To put this in more general terms: of the n-sections, one section is held at a reference level and the input terminal is located at a junction $(n-1)/2$ sections removed from the reference level section, all n-sections of the potentiometer being connected serially.

In this manner there will always be at least one of said signals at reference potential while the amplitude of the remaining signals are varied in amplitude, but no one output signal will ever reach maximum amplitude simultaneously with any other output signal.

Although the description which follows is in terms of rotary potentiometers the invention may be practiced with slide control potentiometers as well, as may be inferred from the differing schematic presentations in FIG. 1 and FIG. 3.

In practice it will be found that in achieving the above results no more than three terminals making fixed contact to the potentiometer's resistive surface or windings will be required. This is true since in ganging the pots for simultaneous control the individual potentiometers may be oriented for sequential selection of the sections which are held to the selected reference. It will be even more apparent that the section held at the reference level may itself consist of a good conductor rather than a resistive strip or winding.

It should also be obvious to one skilled in the art that more than one section of a pot may be held at a constant reference level and that input terminal connections may be made so that more than one output terminal will reach maximum output levels simultaneously.

Though those skilled in the art will find particular uses for $n$-ganged, $n$-section potentiometers, the three gang 3-section pot holds particular utility when used to control the hue of a color display. Potentiometers such as disclosed here may be readily obtained to specification. For example, CTS Corp. was able to provide a 3-gang potentiometer, each pot having three sections of 500 ohms each. The CTS part number assigned was YS 9387-1377403 (Type XP3-49).

The development of a color control system based upon the use of the invention as a hue control will now be disclosed.

In the embodiment of the invention disclosed here and illustrated in FIG. 3, amplifier $A_1$ is an op-amp such as, for example, National Semi-Conductor's LH0032CG. Dual-input amplifiers $A_2$, $A_3$ and $A_4$ are integrated circuits such as, for example, Motorola Corp's. MC1545L. Variable resistors $R_2$, $R_3$ and $R_4$ each comprise a 3-gang potentiometer such as disclosed in FIG. 1 as pots P-1 through P-3, each of the sections (1), (2), (3) has a resistance of 500 ohms. It should be understood that the three sections of the potentiometer are constructed such that the potentiometer wiper moves smoothly from one section to the next without interruption.

One section of each of the 3-gang potentiometers $R_2$, $R_3$, $R_4$ has both ends grounded, a different section being so grounded in each potentiometer. For example, in the embodiment disclosed, $R_2$ has section (1) grounded, $R_3$ has section (2) grounded, and $R_4$, has section (3) grounded.

The input signal from brightness amplifier $A_1$ is connected at the junction of the remaining two sections not so grounded in each potentiometer $R_2$, $R_3$, $R_4$. It is the novel arrangement of pots $R_2$, $R_3$ and $R_4$ which allows the signal from amplifier $A_1$ to be simultaneously apportioned among the corresponding terminal 1 inputs of dual-input amplifiers $A_2$, $A_3$, and $A_4$. As the wiper arm of the pot is actuated, the proportion of the input signal presented to each dual input amplifier is simultaneously controlled producing the signal variation described above with the resultant traversal of the perimeter of the color triangle.

With the signal from amplifier $A_1$ connected to pots $R_2$, $R_3$ and $R_4$ in the manner just described the output to the color amplifiers $A_2$, $A_3$ and $A_4$ will be made up of two signals whose relative levels are dependent upon the setting of the potentiometers. At any given time, some one of the pots will have zero output since its wiper arm will be connected to a section grounded at each end. For example, in FIG. 3 as drawn, amplifiers $A_2$ and $A_4$ receive outputs from pots $R_2$ and $R_4$ while amplifier $A_3$ receives no signal; section 2 of pot $R_3$ being grounded at each end. The reason for this arrangement will now be more fully discussed.

Typically a given color or hue may be defined by a set proportion of red, green and blue and may be equated as follows:

$$H = K_1R + K_2G + K_3B$$

where
  H is the hue desired;
  R, G, and B are the pure colors, Red, Green, and Blue; and
  $K_1$, $K_2$, and $K_3$ are constants defining the proportions of each pure color comprising the resultant hue, H.

In FIG. 3, the input at terminal 1 of amplifiers $A_2$, $A_3$ and $A_4$ is, respectively,
  $K_1R = 1/2V_1$
  $K_2G = 0V_1$
  $K_3B = 1/2V_1$ where $V_1$ is the signal presented to Hue control $R_2$, $R_3$ and $R_4$ from brightness amplifier $A_1$.

As is well known, it is possible to define the entire range of hue by sequentially setting first one constant K to zero while varying the remaining two constants then repeating the procedure with a different constant held at zero. A typical sequence might be:
  $K_1$ = zero, vary $K_2$, $K_3$; then
  $K_2$ = zero, vary $K_1$, $K_3$; then
  $K_3$ = zero, vary $K_1$, $K_2$.

In this manner the entire perimeter of the familiar color triangle, FIG. 4, may be traversed and the complete range of fully saturated hues achieved. It will be recognized that the disclosed connection of pots $R_2$, $R_3$, and $R_4$ provides for this latter approach as will be discussed later.

The entire display system may be set up as a so-called equal value system. In such a system a white display is presented when
  white = $K_1R + K_2G + K_3B$
where
  $K_1R = K_2G = K_3B$.

When the invention herein disclosed is used with such a system, the display presented at the color CRT will tend toward white as the outputs of the color amplifiers $A_2$, $A_3$, and $A_4$ tend toward equality.

At this point it would be well to consider the color triangle, FIG. 4, in relation to the operation of the invention. The color triangle may be conceived as an equilateral triangle with the three vertices representing the pure, fully saturated hues R, G, and B. Any point along a given side of the triangle represents a fully saturated hue consisting of a mixture of the two colors at each vertex connected by the given side of the triangle.

Consider the traversal of side RG of the triangle as one moves from vertex R to vertex G. Initially the hue would be a fully saturated, pure red. Moving toward vertex G, the color presented, though fully saturated, would contain an increasing component of green. However, the red component's contribution would be decreasing. At the center of line RG a fully saturated mixture of red and green would obtain. At the G vertex, the red component would be zero and the color would be that of the pure, fully saturated green hue. Similar statements can be made concerning the effect of traversing the remaining two sides of the triangle, i.e., GB and BR.

The interior of the triangle comprises a blending of non-saturated hues, such that as one moves inward from a side of the triangle, the color pales from a fully saturated hue to white at the center of the triangle of FIG. 4, the white representing equal mixtures of R, G and B.

Assume now that the wiper arms of pots $R_2$, $R_3$, and $R_4$ in FIG. 3 are to the extreme left of their respective sections (1). In this position the red output of $R_2$ would be zero, the green output of $R_3$ would be maximum, and the blue output of $R_4$ would be zero. As the ganged wiper arms move to the right, red, $R_2$, remains at zero, green, $R_3$, decreases and blue, $R_4$, increases. This is analogous to traversing the color triangle along the GB side from vertex G to vertex B as already discussed. As the wiper arms continue to move into and across section (2) of pots $R_2$, $R_3$, and $R_4$, green remains at zero, red increases and blue decreases: a traversal of the triangle from vertex B to vertex R. Continued movement of the wiper arms to the right across sections (3) finds blue remaining at zero, red decreasing and green increasing which is analogous to a traversal of the color triangle from vertex R to G. Thus, one complete movement of the wiper arms across all three sections of $R_2$, $R_3$ and $R_4$, as described above, is the equivalent of moving about the perimeter of the color triangle from vertices G to B to R to G.

The invention, as disclosed to this point, will provide fully saturated pure color outputs, but if the degree of saturation, i.e., pure color to pale color to white, is to be controlled, it is necessary to supply a means of adding appropriate amounts of R, G and B.

As previously noted, amplifiers $A_2$, $A_3$, and $A_4$ have dual input terminals, terminals 1 and 2, and a gated terminal 3, all as indicated in FIG. 3. The weight of the gate signal at terminal 3 controls the manner in which the two input signals to each amplifier are summed, as indicated in the following table.

| Weight of Gate 3 | Output Weight of Channel 1 | 2 |
| --- | --- | --- |
| 0 | 1 | 0 |
| ¼ | ¾ | ¼ |
| ½ | ½ | ½ |
| ¾ | ¼ | ¾ |
| 1 | 0 | 1 |

In general, the output contribution of channel 1 is one minus the weight of gate 3, (1-W), while the output contribution of channel 2 is equal to the weight of gate 3, (W).

In the embodiment disclosed by the figure, the setting of Saturation control potentiometer $R_5$ controls the weight of the gate signal at terminal 3 of each amplifier $A_2$, $A_3$, and $A_4$ and thus controls the output of each of the color amplifiers, thereby affecting the saturation of the color displayed on the CRT presentation.

That this is true may be established by a brief review of the circuit operation. The initial determination of hue was established by setting the hue control $R_2$, $R_3$, $R_4$. The output of amplifiers $A_2$, $A_3$, and $A_4$ with only the input from the Hue control would cause the presentation of a pure fully saturated hue on a color CRT. Reducing the strength of a given hue and adding white to it (that is, in an equal value system, adding equal amounts of R, G, and B), reduces the saturation and, if continued, culminates in a white presentation of the color CRT. Adjustment of the saturation control, because of the gated nature of amplifiers $A_2$, $A_3$, and $A_4$, results in reducing the strength of the hue signal on channels 1 and increases the "white" signals from channels 2 of the color amplifiers thereby controlling the saturation of the color finally presented on the CRT.

As seen from FIG. 3 and the foregoing discussion, the first channel, terminal 1 of each of the color amplifiers, receives a signal at a level established at the respective output of the Hue control, pots $R_2$, $R_3$, $R_4$, while the second channel, terminal 2 of the color amplifiers, receives a signal whose level is equal to that presented at the output of the brightness amplifier $A_1$.

Given an input signal $V_{in}$ the signal at the output of brightness amplifier $A_1$ may be defined as $V_1 = XV_{in}$ where X is the gain of amplifier $A_1$. The output from each color amplifier $A_2$, $A_3$, and $A_4$ may then be set out as $$V_0 = V_1 [K(1-W) + W]$$

wherein
K represents the setting of the hue control for the color amplifier in question, and
W is the weight of the gate signal as determined by the setting of the saturation control.

The signal $V_1$ is also provided to a luminance output port labeled Y in FIG. 3. The invention disclosed may be utilized in three-channel RGB color systems or four-channel RGBY color systems in conventional manner.

It should be noted that FIG. 3 discloses a preferred embodiment. The brightness amplifier could be replaced with three other amplifiers, one each in each output line all having a common gain control. Similarly, the three output signal lines could be sampled, the sampled levels summed and amplified as a luminance signal, Y. The circuit disclosed, however, is preferred because of its greater simplicity.

The preferred embodiment as disclosed has an important characteristic in that regardless of whether the output video is fed to low or high impedance devices, the hue, saturation and brightness controls operate completely independently and without interaction.

The invention disclosed presents method and apparatus for achieving a color presentation from a video signal which may have no color content of its own. The circuitry provides three simple, noninteracting controls: one each for Hue, Saturation and Brightness. The Hue control results from a novel use of three 3-gang potentiometers while the saturation control derives from utilization of weighted summing of signals in a dual input amplifier. It will be obvious to those skilled in the art that changes and modifications may be made to the invention herein without departing materially from the inventive concepts disclosed. It is therefore intended to cover herein all such changes and modifications as fall within the true spirit and scope of the invention.

What is claimed is:
1. A method for variably controlling, simultaneously, the output amplitude of n-signals, n being odd, such that no one of said signals reaches maximum input amplitude at the same time as any other one of said signals and a selected one of said signals is held at a constant reference level while the remaining signals, not so selected, are varied in amplitude, comprising the steps of:
   a. providing one potentiometer for each of said n-signals, each potentiometer having n-sections all connected serially to each other;
   b. holding one of said n-sections in each of said potentiometers at a desired reference level;
   c. connecting one each of said signals to an input terminal of one each of said potentiometers such that the input terminal is itself connected to a point (n-1)/2 sections removed from said section so held at said reference level;
   d. ganging all of said potentiometers' wiper arms for simultaneous control and such that, as the ganged wiper arms are rotated, there will be a sequential progression of the contacts of said wiper arms into and through said sections so held at said reference level; and
   e. extracting an output signal from the wiper arm contact of each of said potentiometers.

2. Apparatus for presenting full color video signals to a color display system wherein the input signal to said apparatus is a video signal which may have no color content of its own, said apparatus comprising:
   means to divide said input signal into at least three pair of signal paths;
   means to simultaneously variably apportion among first ones of each pair of signal paths the level of said divided input signal appearing there;
   means to add the signals on the first and second ones of each pair of signal paths in a simultaneously controlled manner such that the contribution to the sum signal from one signal path of said pairs will be descreased while the contribution from the other signal path of said pair will be increased; and means to present each of said summed signal pairs to a color display system as color information signals; and means to present a portion of said input signal to said color display system as a luminance signal.

3. The apparatus as disclosed in claim 2 including means to variably adjust the level of said input signal.

4. The apparatus of claim 2 wherein the means to simultaneously variably proportion the level of said divided input signal among first ones of each pair of signal paths comprise multi-section potentiometers having at least three sections each, one section of which is connected to a common reference level at each end, there being a different section so connected in each of said potentiometers, one of said potentiometers being tied into each of said first ones of each pair of signal paths such that the input signal from said signal path is applied to the junction between the remaining two sections and the wiper arms of the potentiometers provide output signals to the means for adding, the wiper arms being ganged together for simultaneous control.

5. The apparatus of claim 2 wherein the means to add the signals on the first and second ones of each pair of signal paths in a simultaneously controlled manner comprise dual-input amplifiers having a weighting gate-terminal and a source from which a variable weighting signal may be obtained such that when the signal appearing at one of each of said signal pair-paths is fed to a corresponding one of said dual inputs of said amplifiers, the amplitude of said weighting signal applied to said weighting gate-terminal will control the contribution of each one of said pair of signals to the sum signal output of said dual input amplifier such that as the contribution of one signal of said signal pairs is increased that of the other is decreased.

6. Apparatus for presenting full color video signals to a color display system wherein the input signal to said apparatus is a video signal which may have no color content of its own, said apparatus comprising:
   a. an input amplifier stage to the input of which is applied said video signal having no color content;
   b. means for controlling the gain of said input amplifier stage whereby the brightness of the presentation of said color display may be controlled;
   c. three dual input amplifiers, each having first and second input terminals and a weighting gate terminal said first and second input terminals being connected to the output of said input amplifier stage;
   d. means for simultaneously controlling the levels of signal applied to each of said first input terminals of said dual input amplifiers and simultaneously apportioning said signal levels among said first input terminals said means comprising the ganging of three 3-section potentiometers, a different one of each of said 3-sections in each of said potentiometers being connected at each end to a common reference, one each of said potentiometers being connected between the output of said input amplifier stage and said first input terminal of each dual-input amplifier such that the output of said amplifier stage is applied to the junction between the remaining two sections and the wiper arms of the potentiometers provide output signals to said first input terminals of a corresponding one of said dual-input amplifiers, whereby control of said ganged potentiometers affects the hue of the presentation of said color display;
   e. a weighting signal source applying a weighting signal to said weighting gate terminal and a means to control the level of said weighting signal so applied wherein the output contribution of the signal levels appearing at said first and second terminals of said dual input amplifiers may be simultaneously controllably apportioned and the saturation of the presentation of said color display controlled;
   f. output terminals from each of said dual input amplifiers so that three separate chrominance signals may be available to said color display system; and
   g. an output terminal from the output of said input amplifier stage so that a luminance signal may be available to said color display system.

7. Apparatus for generating color video signals for use with a color display system in response to a video input signal comprising:
   hue control means for receiving an input video signal and for providing output signals representative of said input video signal and simultaneously proportioned according to the selected hue of a color display by means of a single control;
   first, second and third control means, each including a first input terminal for receiving one of said proportioned output signals, a second input terminal for receiving said input video signal, an output terminal for providing a saturation signal responsive to signals applied at said first and second input terminal and adaptable for use as a color video signal, and a control terminal for receiving a signal to selectively adjust the contribution and input video signal and said proportioned output signal have on said saturation signal; and
   means for providing a control signal to said control terminals of said first, second and third control means.

8. The apparatus of claim 7 and further comprising means for selectively amplifying said input video signal to control the brightness of the presentation of said color display.

9. The apparatus of claim 7 wherein said hue control means comprise multisection potentiometers having at least three sections each, one section of which is connected to a common reference level at each end, there being a different section so connected in each of said potentiometers, each of said potentiometers being connected to receive said input video signal at the junction between the remaining two sections, the wiper arms of said potentiometers providing proportioned output signals to the first input terminal of a corresponding one of said first, second, or third control means.

10. A method for obtaining a color display controllable in hue and color saturation from a video signal which may have no color content of its own, comprising the steps of:
   a. dividing said video signal into at least three pair of signal paths;
   b. simultaneously and controllably apportioning among first ones of each pair of signal paths the level of said divided signal appearing there, such controlled apportioning establishing the hue of the final color presentation;
   c. combining each signal pair in a simultaneously controllable manner such that the contribution to the sum signal from one signal path of said pair decreases while the contribution from the other of said signal pair increases, such apportioned combination establishing the saturation of the final color presentation;
   d. presenting each of said summed signal pairs to a color display system as red, green and blue color information signals; and
   e. presenting a portion said video signal to said color display system as a luminance signal.

* * * * *